UNITED STATES PATENT OFFICE.

HENRY WISEBAUGH, OF CANTON, OHIO.

MEDICAL COMPOUND FOR DIPHTHERIA.

SPECIFICATION forming part of Letters Patent No. 259,070, dated June 6, 1882.

Application filed December 29, 1881. (No specimens.)

*To all whom it may concern:*

Be it known that I, HENRY WISEBAUGH, of Canton, in the county of Stark and State of Ohio, have invented certain new and useful Improvements in Diphtheria Medicines; and I do hereby declare the following to be a full, clear, and exact description of the invention, such as will enable others skilled in the art to which it appertains to make and use the same.

This invention relates to an improved composition of materials to form a medicine for the cure of diphtheria.

The various ingredients used in the manufacture of the medicine, the proportional amounts thereof, and the method of preparing are substantially as follows: White-oak bark and rattleweed-root, in the proportion of four pounds of the former to one of the latter, are placed in a vessel with one gallon of water. They are then subjected to boiling until the material is reduced to the volume of half a gallon. After being sufficiently boiled, alum and borax are added to the decoction in the proportions of four ounces of alum and four ounces of borax to the above-given proportions of bark and rattleweed-root.

The ingredient which I have above alluded to as "rattleweed-root" is also known in some sections as "black snake-root," and is designated botanically by the term "*Cimicifuga racemosa.*"

After the materials become sufficiently cooled they are strained, and are ready for use.

My improved composition may be applied to the parts affected either by gargling or by a swab moistened with the medicine, the latter method being preferred at the early stages of the treatment.

It has been found that in serious cases of diphtheria the application of this compound every hour has caused the removal of the foreign matter produced in diphtheritic diseases in from three to four hours.

I have as yet not failed to cure a case of diphtheria when this composition was employed, and I have also found it a successful remedy for other kindred throat-diseases. It may be taken internally also by the patient with great benefit when suffering from these diseases.

When the medicine is taken internally the dose should be varied in quantity according to the age of the patient, a few drops being sufficient for an infant, and a table-spoonful for an adult.

I am well aware that the various ingredients of which my improved diphtheria medicine is formed have been severally used in various other compounds, but believe myself to be the first to discover that the above ingredients combined together in substantially the proportions named produce a remedy for diphtheria of great effect and utility.

What I claim is—

As a diphtheria medicine, the herein-described compound, consisting of white-oak bark, *Cimicifuga racemosa*, alum, borax, and water, in substantially the proportions herein named.

In testimony that I claim the foregoing I have hereunto set my hand.

HENRY WISEBAUGH.

Witnesses:
HENRY FISHER,
A. C. HINER.